Dec. 2, 1924.  
G. SHMITT  
1,518,009  
POWER TRANSMITTING MECHANISM  
Filed Nov. 24, 1923    2 Sheets-Sheet 1
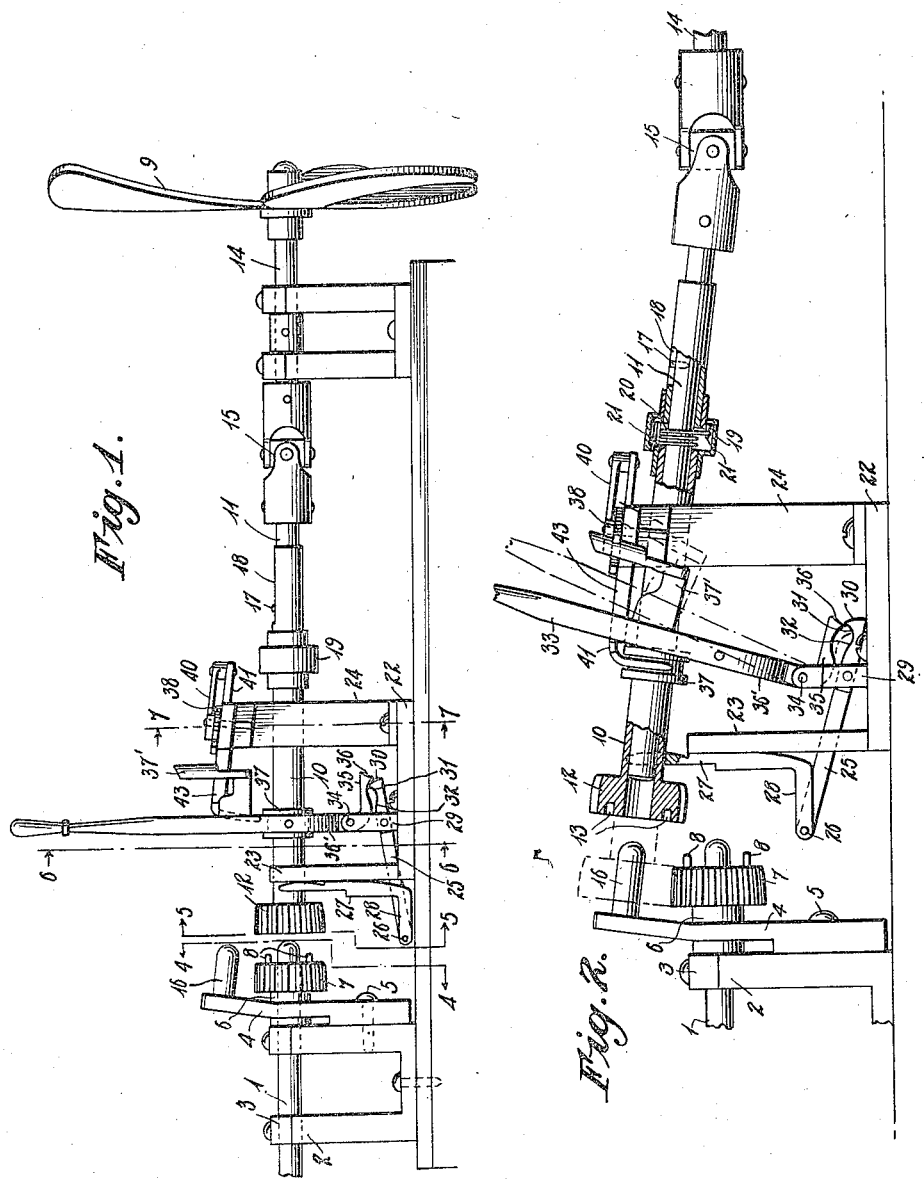
Inventor  
George Shmitt  
By Bacon & Thomas  
Attorneys Dec. 2, 1924.                                                    1,518,009
G. SHMITT
POWER TRANSMITTING MECHANISM
Filed Nov. 24, 1923          2 Sheets-Sheet 2
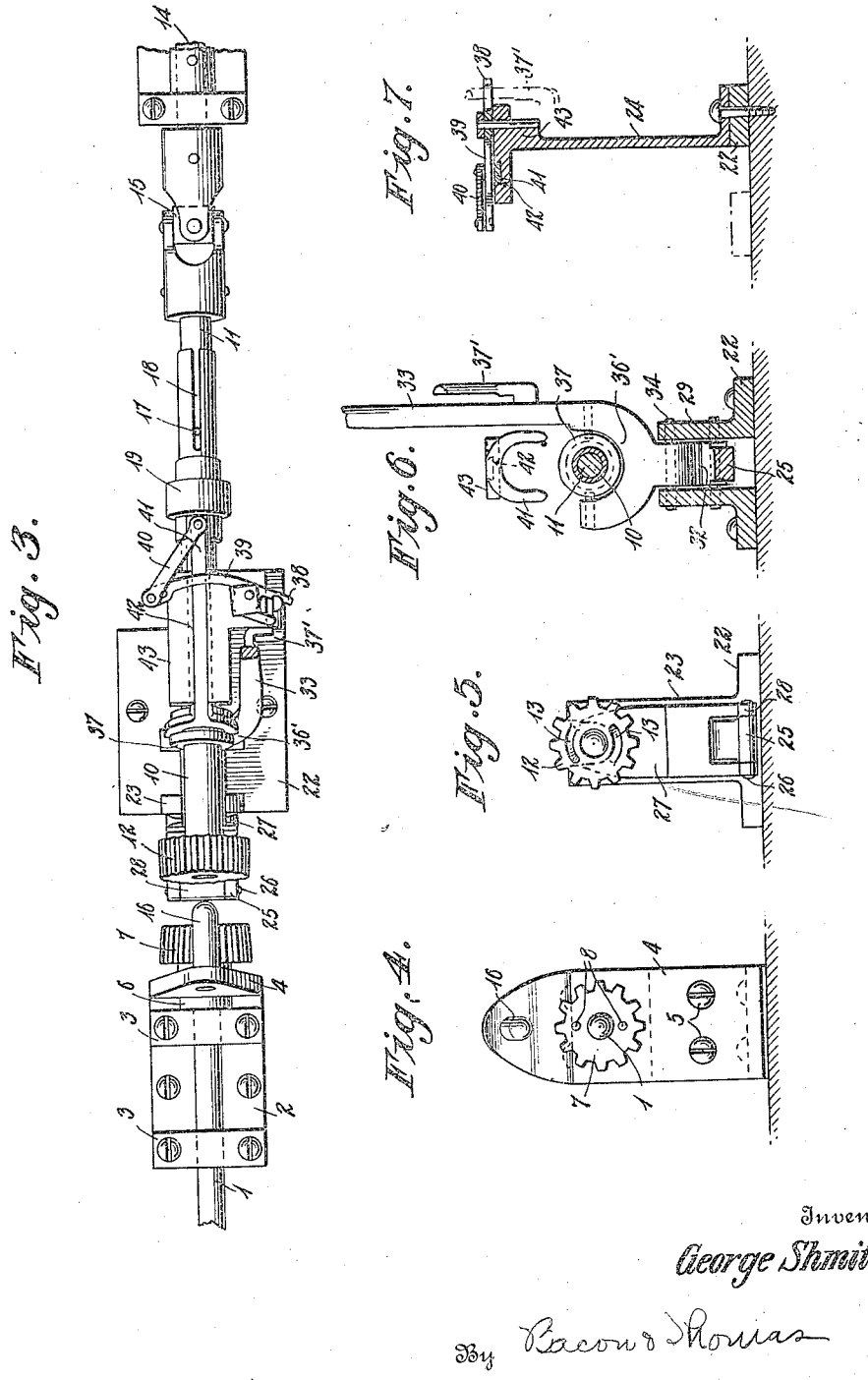
Inventor
George Shmitt
By Bacon & Thomas
Attorneys Patented Dec. 2, 1924.

1,518,009

UNITED STATES PATENT OFFICE.

GEORGE SHMITT, OF PITTSBURGH, PENNSYLVANIA.

POWER-TRANSMITTING MECHANISM.

Application filed November 24, 1923. Serial No. 676,777.

*To all whom it may concern:*

Be it known that I, GEORGE SHMITT, a citizen of the United States, residing at Pittsburgh, in the county of Allegheny and State of Pennsylvania, have invented certain new and useful Improvements in Power-Transmitting Mechanism, of which the following is a specification.

The invention relates to improvements in speed changing power transmissions, particularly useful in the propulsion of vessels, although applicable in any field where such a mechanism is useful.

It is an object of the invention to provide a reversible power transmission whereby a driven article such as a propeller or the like can be rotated in either a forward or reverse direction by shifting a portion of the driven shaft to permit a direct drive, or to cause a meshing of gears to reverse the rotation of the propeller or the like.

From a more specific aspect, the invention comprehends a power transmission device wherein the driven shaft is shiftable to provide a direct drive from a driving shaft, with connecting mechanism to disconnect the driven shaft, after which the same is elevated and then shifted longitudinally so as to permit a gear carried thereby to mesh with a gear on the driving shaft to rotate said driven shaft in a reverse direction. This manifestly eliminates the use of a multitude of change speed gearings and permits a driven article to be moved in either forward or reverse directions by a simple and inexpensive mechanism.

In the accompanying drawings I have shown a preferred embodiment of the invention, but this showing is only illustrative and many changes can be made without departing from the spirit thereof.

In the drawings Figure 1 represents a side elevation of the device with the driving shaft broken away.

Figure 2 is a side elevation with parts in section.

Figure 3 is a top plan view; and,

Figures 4, 5, 6 and 7 are sectional views through different parts of the apparatus.

Referring now more particularly to the drawings wherein like reference characters indicate corresponding parts, the numeral 1 designates a driven shaft, which may be the crank shaft of an internal combustion engine, steam engine or the like, or a continuation of such shaft, which shaft 1 is mounted in a U-shaped bearing 2 having the removable bearing caps 3. One of the uprights of the U-shaped bearing 2 is provided with an attachment 4 bolted thereto by the rivets 5 and carrying a bearing 6 through which the shaft 1 extends, said shaft at its end having keyed thereto a gear 7 provided with the usual peripheral teeth and clutch pins 8 to be later described.

The invention relates primarily to a transmission device for taking off power from the shaft 1 and transmitting said power to a propeller 9 or other driven object so that such propeller or object may be conveniently rotated in a forward or reverse direction without the use of trains of gears and expensive transmissions as now generally employed for this purpose. To this end the mechanism includes a driven shaft consisting of the hollow sleeve 10 and the telescopic shaft section 11. The sleeve 10 at its forward end has fitted thereto a gear 12, the outer face of which is formed with pin receiving slots 13 adapted to receive the pins 8 on the gear 7 when a direct drive is had and the propeller 9 to be driven in a forward direction. The shaft 11 is connected to the stub shaft 14 by the universal joint 15 so that said shaft 11 with the sleeve 10 may be elevated to permit the gear 12 thereon to be received by the gear support 16 on the bracket 4 and the teeth on the gear 12 thrown in mesh with the teeth on the gear 7. Obviously, when such a connection is made, the propeller 9 rotates in a direction the reverse of the direction of rotation produced by a direct drive between the sleeve 10 and the driving shaft 1. The mechanism for shifting the gear 12 forming a salient feature of this invention will be more fully hereinafter described. The sleeve 10 is slidable on the shaft 11 and a driving connection between the two is provided by means of the key 17 which rides in a longitudinal slot 18 of an extension of said sleeve. Said sleeve is made of two sections, one section terminating at the collar 19 for the purpose of providing in the shaft a yieldable clutch mechanism to prevent damage of the gears 7 and 12 when they are being thrown in mesh. To this end the first section of the sleeve 10 terminates with the collar 19 and interposed in said collar between the sections of the sleeve 10 there is a coil spring 20 which maintains said sections separated a slight distance to permit a slight yielding when the gears are being engaged, it being apparent that as the first section of the sleeve 10 rotates a short rotary movement is permitted through the agency of the spring before the engaging pins 21 carried by the first and second sections of the sleeve contact provided a driving connection between these sections and thereby permitting the power to be transmitted to the shaft 11 through the key 17. In lieu of this type of yieldable clutch any approved mechanism can be used, which will satisfactorily relieve strain on the meshing gears To cause a direct driving connection between the sleeve 10 and the driving shaft 1, as to elevate said sleeve and cause the gear 12 to mesh with the gear 7, to reverse the direction of rotation of the propeller 9, the following mechanism is employed.

Intermediate the ends of the sleeve 10 a standard 22 is provided, having the upstanding yoke supporting extension 23 and the lever mounting plate 24. Extending between the arms of the yoke support 23 is a lever 25, the outer end of which is pivoted at the point 26 to the yoke 27, which is formed with a right angle extension 28, the yoke at the end of said arm 27 engaging the sleeve 10 and constituting means for elevating the same when said arm is raised. The lever 25 is pivoted in the uprights 29 near its end and the end of said lever is provided with an exterior cam surface 30 and an opposed cam surface 31. This lever at its end is also dished as represented by the numeral 32. The lever 25 is elevated and maintained in an elevated position through the agency of the shifting hand lever 33, which is pivoted at the end of the uprights 34 and which among other things carries a right angle extension 35 having a beveled portion 36 which coacts with the beveled surfaces 30 and 31 of the lever 25. The hand lever 33 is further formed with a yoke 36' which constitutes a support for the sleeve 10 and engages a collar 37 rigidly connected with said sleeve for the purpose of moving said sleeve back and forth relative to the shaft 11 to engage and disengage the sleeve with the shaft 1. Assuming that the hand lever 33 is in the dotted line position shown in Figure 1, then at this time the sleeve 10 will be in an extended position and the driving pins 8 on the gear 7 will mesh with the slots 13 in the gear 12 and a direct drive is taking place through the sleeve 10, the key 17 to the shaft 11. This, of course, will propel the bolt or other vessel in a forward direction at a rather rapid rate of speed. If the rotation of the propeller 9 is to be reversed, then the hand lever 33 is shifted rearwardly to the full line position shown in Figures 1 and 2. As this lever moves rearwardly it disengages the pins 8 from the slots 13 in the gear 12 by reason of the connection between the yoke 36 of the lever with the collar 37, and the continued rearward movement of the lever causes the beveled part 36 of the extension 35 to engage and ride upwardly over the outer beveled surface 30 of the lever 25 to lift this lever 25 with the yoke supporting lever 27 to the full line position shown in Figure 2. As the beveled portion 36 of the extension 35 passes around the cam surface 30 of the lever 25, its opposite beveled surface then passes down over the beveled surface 31 of this lever 25 and serves to lock or hold the yoke support 27 in an elevated position during a further or continued movement of the hand lever 23 which serves to shift or move the entire sleeve 10 forwardly in a longitudinal direction until the gear 12 meshes with the gear 8, at which time the gear will be in the dotted line position shown in Figure 2.

The mechanism for advancing the gear 12 forwardly after it has been elevated to a position overlying the gear 8, will now be described. When the hand lever 33 has been moved so that the beveled portion 36 on the extension 35 has ridden over the cam surface 30 and arm 37' disposed rearwardly of said hand lever 33 engages a yoke 38 at the end of the pivoted lever 39 mounted upon the end of the standard 24. This pivoted lever 39 at its end is pivoted to a link 40, which link in turn is pivoted to a sliding yoke 41 which rides in a dove tail groove 42 in a flat support 43 mounted on the standard 24 and overlying the sleeve 10. The yoke on the end of said yoke lever 41 engages the fixed collar 37 on the sleeve 10 and manifestly any movement imparted to this yoke will cause the sleeve to be advanced in the direction of such movement. After the arm 37 engages the yoke end 38 of the lever 39 the continued movement of said arm in a rearward direction causes the free end of the lever 39 to be advanced, which advancing movement is transmitted to the yoke lever 41 through the link 40, which motion is transmitted to the shaft 10 through the collar 37 thereby advancing the gear 12 to a forward position where it overlies and meshes with the gear 8. When thus connected the propeller 9 is obviously rotated in a reverse direction and continues to so rotate until the sleeve 10 with its gear 12 is again shifted. To shift from this position to a direct drive it is only necessary to move the hand lever 33 forwardly, which movement manifestly swings the lever 39 rearwardly causing the yoke lever to withdraw the gear 12 from the gear 8. This movement is continued until the member 37 disengages from the yoke 38 on the lever 39 whereupon the cam projection 36 on the extension 35 begins to ride down over the cam surface 30 of the lever 25, until the sleeve 10 is lowered in alignment with the drive shaft 1. The final forward movement of the hand lever 33 therefore exerts no influence on the elevating and advancing mechanism hereinbefore described, but merely through the yoke 37 thrusts the sleeve 10 forwardly until the pins 8 on the gear 7 enter the sockets 13 in the gear 12. This permits the direct drive of the propeller 9 in a forward direction.

Having thus described my invention, what I claim is:

1. In a power transmission device, the combination with a driving shaft having a gear thereon, a driven shaft provided with a gear and adapted to be rotated by said drive shaft selectively in opposite directions, means for connecting said drive and driven shafts to rotate the driven shaft in one direction, a lever for disengaging said connection, mechanism operated by said lever when said shafts are disengaged for shifting said driven shaft out of line with the drive shaft, and instrumentalities operable upon a continued movement of said lever for moving said driven shaft forwardly until the gear thereon meshes with the gear on the drive shaft, said last mentioned instrumentalities including an arm adapted to be engaged by said lever, a link connected with the arm and a longitudinally movable yoke connected with said link and with said driven shaft.

2. In a power transmission device, the combination with a drive shaft having a rotating gear thereon, a driven shaft adjacent to said drive shaft, means for coupling said driven and drive shafts to rotate said driven shaft in one direction, mechanism for disengaging said shafts and for rotating the driven shaft in an opposite direction, comprising an operating lever for moving said driven shaft, a shiftable shaft support operable upon the movement of said lever for moving the driven shaft out of alignment with the drive shaft, advancing means cooperating with said driven shaft and operable by said lever for moving said shafts to a position to engage the gear thereon with the gear on said drive shaft, said shifting mechanism including a cam surface operable by a cam surface on the lever and the advancing mechanism comprising a swinging lever, a yoke operable by said lever and a connection between said yoke and said driven shaft.

3. In a power transmission device, the combination with a drive shaft adapted to rotate in one direction, a gear thereon, a driven shaft and a gear adjacent one end thereof, said driven shaft being adapted to operate selectively in opposite directions, coupling means between said shafts for effecting a drive including a lever mechanism for disengaging said coupling means, and operable to shift said driven shaft rearwardly, means operated by said lever during a portion of its movement for moving the shaft laterally, other mechanism operable by said lever upon a continued movement for then shifting said shaft forwardly while held in its lateral position to effect a driving relation with the gear on the driven shaft, said lever being also adapted to move said shaft in direct driving relation with said drive shaft, substantially as described.

4. In a power transmission device, the combination with a drive shaft having a gear thereon, a driven shaft provided with a gear and adapted to be rotated thereby selectively in opposite directions, means for effecting driving relation between said drive and driven shafts including a lever connected with said driven shaft adapted when moved in one direction to shift said driven shaft into direct driving relation with said drive shaft, said lever being adapted when moved in an opposite direction to disengage said direct connection between said shafts, means operable by said lever for a portion of its movement for moving said driven shaft laterally out of alignment with said drive shaft and for supporting said shaft in its laterally shifted position, a lever operated coupling mechanism adapted to be subsequently engaged by said operating lever on a continued movement thereof for moving said driven shaft forwardly while in supported laterally shifted position to effect a coupling between the gear thereon and the gear on said driven shaft.

5. In a power transmission device, the combination with a drive shaft having a drive gear thereon, a driven shaft provided with a gear thereon adapted to be rotated by said drive shaft selectively in opposite directions, mechanism for coupling said shafts whereby said driven shaft is rotated in opposite directions comprising a shifting lever cooperating with said shaft and adapted when moved in one direction to couple said shafts in operative relation, said lever being adapted to disengage said shafts when moved in another direction, and to couple said shafts whereby the driven shaft is rotated in an opposite direction, mechanism operable by said shifting lever for a predetermined movement thereof to move said driven shaft laterally and to maintain said shaft in its shifted lateral position relative to the drive shaft, other mechanism cooperating with said driven shaft and adapted to be engaged by said shifting lever to effect a driving relation between said gears upon a continued movement of said lever to drive said driven shaft in a reverse direction.

6. In a power transmission device, the combination with a drive shaft having a gear thereon, a driven shaft provided with a gear thereon adapted to be rotated by said drive shaft selectively in opposite directions, mechanism for coupling said shafts whereby said driven shaft is rotated in opposite directions comprising a shifting lever cooperating with said shaft and adapted when moved in one direction to couple said shafts in operative relation, said lever being adapted to disengage said shafts when moved in another direction, and to couple said shafts whereby the driven shaft is rotated in an opposite direction, mechanism operable by said shifting lever for a predetermined movement thereof to move said driven shaft laterally and to maintain said shaft in its shifted lateral position relative to the drive shaft, other mechanism cooperating with said driven shaft and adapted to be engaged by said shifting lever to effect a driving relation between said gears upon a continued movement of said lever to drive said driven shaft in a reverse direction, said last mentioned mechanism comprising pivoted levers, an operating arm therefor lying in the path of movement of said shifting lever, for advancing and returning said driven shaft in consonance with a movement of said shifting lever.

7. In a power transmission device, the combination with a drive shaft having a gear thereon, a driven shaft adapted to be rotated thereby selectively in opposite directions, a shifting lever adapted to move said driven shaft in one direction to provide a driving connection between said driven shaft and said driving shaft, means operated by said lever for effecting a driving relation between said shafts to drive said driven shaft in an opposite direction including mechanism operated by said shifting lever for moving said driven shaft laterally and supporting a shaft in its shifted lateral position, independent mechanism adapted to be operatively engaged by said shifting lever upon its continued movement, said mechanism being operatively connected with said driven shaft and adapted to advance said shaft when engaged by said shifting lever to place the cooperating gears in mesh.

8. In a power transmission device, the combination with a drive shaft having a gear thereon, a driven shaft adapted to be rotated thereby selectively in opposite directions, a shifting lever adapted to move said driven shaft in one direction to provide a driving connection between said driven shaft and said driving shaft, means operated by said lever for effecting a driving relation between said shafts to drive said driven shaft in an opposite direction including mechanism operated by said shifting lever for moving said driven shaft laterally and supporting a shaft in its shifted lateral position, independent mechanism adapted to be operatively engaged by said shifting lever upon its continued movement, said mechanism being operatively connected with said driven shaft and adapted to advance said shaft when engaged by said shifting lever to place the cooperating gears in mesh, said mechanism including an arm disposed in the path of movement of the shifting shaft, levers operated by said arm, said levers being also adapted to start the intermeshing gears when said shifting lever is moved in an opposite direction, substantially as described.

9. In a power transmission device, the combination with a drive shaft having a gear thereon, a driven shaft provided with a gear and adapted to be rotated thereby selectively in opposite directions, a lever for shifting said driven shaft to provide a direct driving relation between said drive and driven shafts, means operable to couple said device to rotate the driven shaft in an opposite direction including mechanism operated by said shifting lever for moving said driven shaft laterally, said mechanism comprising a link, an arm pivotally connected thereto, a two-way cam face at one end of said arm adapted to engage said shifting lever whereby for a portion of its movement said driven shaft is not shifted forwardly but on a continued movement of said lever is shifted laterally, other mechanism for advancing said driven shaft upon a continued movement of said shifting lever to place the gears on said drive and driven shafts in mesh.

10. In a power transmission device, the combination with a drive shaft having a gear thereon, a driven shaft provided with a gear and adapted to be rotated thereby selectively in opposite directions, a lever for shifting said driven shaft to provide a direct driving relation between said drive and driven shafts, means operable to couple said device to rotate the driven shaft in an opposite direction including mechanism operated by said shifting lever for moving said driven shaft laterally, said mechanism comprising a link, an arm pivotally connected thereto, a two-way cam face at one end of said arm adapted to engage said shifting lever whereby for a portion of its movement said driven shaft is not shifted forwardly but on a continued movement of said lever is shifted laterally, other mechanism for advancing said driven shaft upon a continued movement of said shifting lever to place the gears on said drive and driven shafts in mesh, said mechanism including pivotally connected links, and a yoke extending from one of said links to said driven shaft.

11. A power transmitting device, comprising a drive shaft, a gear thereon, a driven shaft and a gear adjacent one end thereof, said driven shaft being adapted to be rotated selectively in opposite directions, coupling means between said shafts for effecting a drive including an operating lever connected with the driven shaft and adapted Patented Dec. 2, 1924.

1,518,009

UNITED STATES PATENT OFFICE.

GEORGE SHMITT, OF PITTSBURGH, PENNSYLVANIA.

POWER-TRANSMITTING MECHANISM.

Application filed November 24, 1923. Serial No. 676,777.

*To all whom it may concern:*

Be it known that I, GEORGE SHMITT, a citizen of the United States, residing at Pittsburgh, in the county of Allegheny and State of Pennsylvania, have invented certain new and useful Improvements in Power-Transmitting Mechanism, of which the following is a specification.

The invention relates to improvements in speed changing power transmissions, particularly useful in the propulsion of vessels, although applicable in any field where such a mechanism is useful.

It is an object of the invention to provide a reversible power transmission whereby a driven article such as a propeller or the like can be rotated in either a forward or reverse direction by shifting a portion of the driven shaft to permit a direct drive, or to cause a meshing of gears to reverse the rotation of the propeller or the like.

From a more specific aspect, the invention comprehends a power transmission device wherein the driven shaft is shiftable to provide a direct drive from a driving shaft, with connecting mechanism to disconnect the driven shaft, after which the same is elevated and then shifted longitudinally so as to permit a gear carried thereby to mesh with a gear on the driving shaft to rotate said driven shaft in a reverse direction. This manifestly eliminates the use of a multitude of change speed gearings and permits a driven article to be moved in either forward or reverse directions by a simple and inexpensive mechanism.

In the accompanying drawings I have shown a preferred embodiment of the invention, but this showing is only illustrative and many changes can be made without departing from the spirit thereof.

In the drawings Figure 1 represents a side elevation of the device with the driving shaft broken away.

Figure 2 is a side elevation with parts in section.

Figure 3 is a top plan view; and,

Figures 4, 5, 6 and 7 are sectional views through different parts of the apparatus.

Referring now more particularly to the drawings wherein like reference characters indicate corresponding parts, the numeral 1 designates a driven shaft, which may be the crank shaft of an internal combustion engine, steam engine or the like, or a continuation of such shaft, which shaft 1 is mounted in a U-shaped bearing 2 having the removable bearing caps 3. One of the uprights of the U-shaped bearing 2 is provided with an attachment 4 bolted thereto by the rivets 5 and carrying a bearing 6 through which the shaft 1 extends, said shaft at its end having keyed thereto a gear 7 provided with the usual peripheral teeth and clutch pins 8 to be later described.

The invention relates primarily to a transmission device for taking off power from the shaft 1 and transmitting said power to a propeller 9 or other driven object so that such propeller or object may be conveniently rotated in a forward or reverse direction without the use of trains of gears and expensive transmissions as now generally employed for this purpose. To this end the mechanism includes a driven shaft consisting of the hollow sleeve 10 and the telescopic shaft section 11. The sleeve 10 at its forward end has fitted thereto a gear 12, the outer face of which is formed with pin receiving slots 13 adapted to receive the pins 8 on the gear 7 when a direct drive is had and the propeller 9 to be driven in a forward direction. The shaft 11 is connected to the stub shaft 14 by the universal joint 15 so that said shaft 11 with the sleeve 10 may be elevated to permit the gear 12 thereon to be received by the gear support 16 on the bracket 4 and the teeth on the gear 12 thrown in mesh with the teeth on the gear 7. Obviously, when such a connection is made, the propeller 9 rotates in a direction the reverse of the direction of rotation produced by a direct drive between the sleeve 10 and the driving shaft 1. The mechanism for shifting the gear 12 forming a salient feature of this invention will be more fully hereinafter described. The sleeve 10 is slidable on the shaft 11 and a driving connection between the two is provided by means of the key 17 which rides in a longitudinal slot 18 of an extension of said sleeve. Said sleeve is made of two sections, one section terminating at the collar 19 for the purpose of providing in the shaft a yieldable clutch mechanism to prevent damage of the gears 7 and 12 when they are being thrown in mesh. To this end the first section of the sleeve 10 terminates with the collar 19 and interposed in said collar between the sections of the sleeve 10 there is a coil spring 20 which maintains said sections separated a slight distance to permit a